United States Patent [19]

Watanabe

[11] Patent Number: 4,618,187

[45] Date of Patent: Oct. 21, 1986

[54] WIRE WHEEL

[75] Inventor: Masae Watanabe, Iwata, Japan

[73] Assignee: Yamaha Hatsudoki Kabushiki Kaisha, Iwata, Japan

[21] Appl. No.: 600,130

[22] Filed: Apr. 13, 1984

Related U.S. Application Data

[63] Continuation-in-part of Ser. No. 571,912, Jan. 18, 1984, abandoned.

[30] Foreign Application Priority Data

| Apr. 15, 1983 | [JP] | Japan | 58-65712 |
| Apr. 15, 1983 | [JP] | Japan | 58-65713 |
| Apr. 15, 1983 | [JP] | Japan | 58-65714 |
| Apr. 15, 1983 | [JP] | Japan | 58-65715 |
| Apr. 15, 1983 | [JP] | Japan | 58-65716 |
| Apr. 15, 1983 | [JP] | Japan | 58-65717 |
| Apr. 15, 1983 | [JP] | Japan | 58-65718 |
| Apr. 30, 1983 | [JP] | Japan | 58-76974 |

[51] Int. Cl.$^4$ .............................................. B60B 1/04
[52] U.S. Cl. ................................... 301/56; 301/105 B
[58] Field of Search ................................. 301/56–59, 301/74, 80, 104, 105 B, 108 B

[56] References Cited

FOREIGN PATENT DOCUMENTS

| 21385 | 7/1916 | Denmark | 301/56 |
| 50-38935 | 11/1975 | Japan . | |
| 55-110602 | 8/1980 | Japan . | |
| 57-199101 | 12/1982 | Japan . | |
| 57-199102 | 12/1982 | Japan . | |
| 457286 | 12/1936 | United Kingdom | 301/56 |

Primary Examiner—David A. Scherbel
Attorney, Agent, or Firm—Ernest A. Beutler

[57] ABSTRACT

Several embodiments of wire wheel arrangements embodying a hub portion, a rim portion and a plurality of spoke pairs for interconnecting the hub and rim portions. In accordance with all embodiments of the invention, the spoke pairs are comprised of ends that are integrally connected by an intermediate portion. The outer ends of the end portions are connected to the rim portion by nipples and the intermediate portion is connected to the hub portion to complete the assembly. Various preferred geometric relationships are disclosed as are arrangements for affixing the intermediate portions to the hub portion.

6 Claims, 18 Drawing Figures

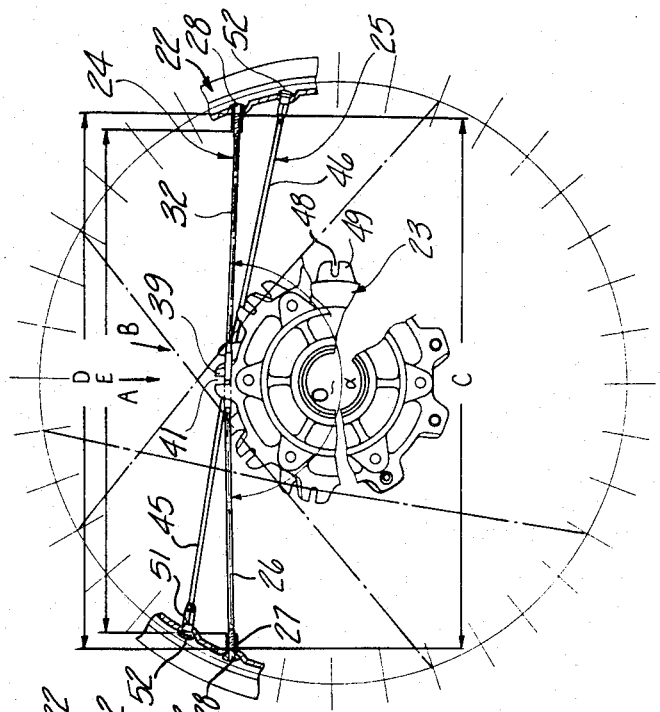
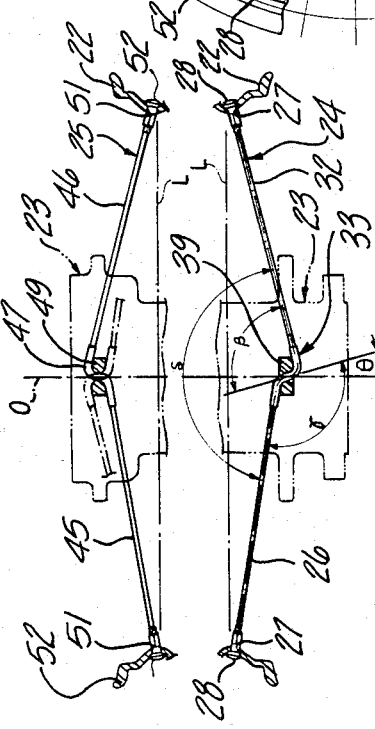
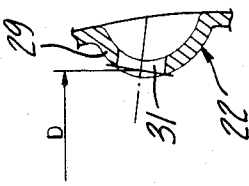

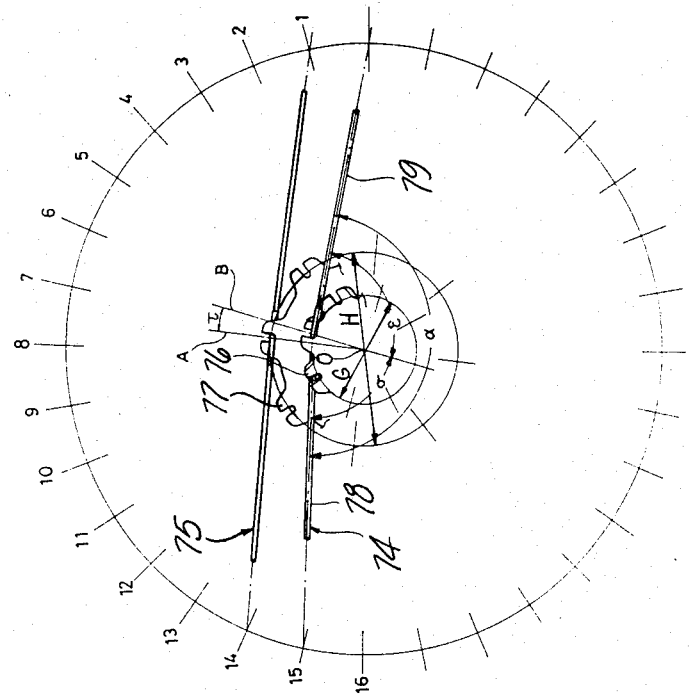

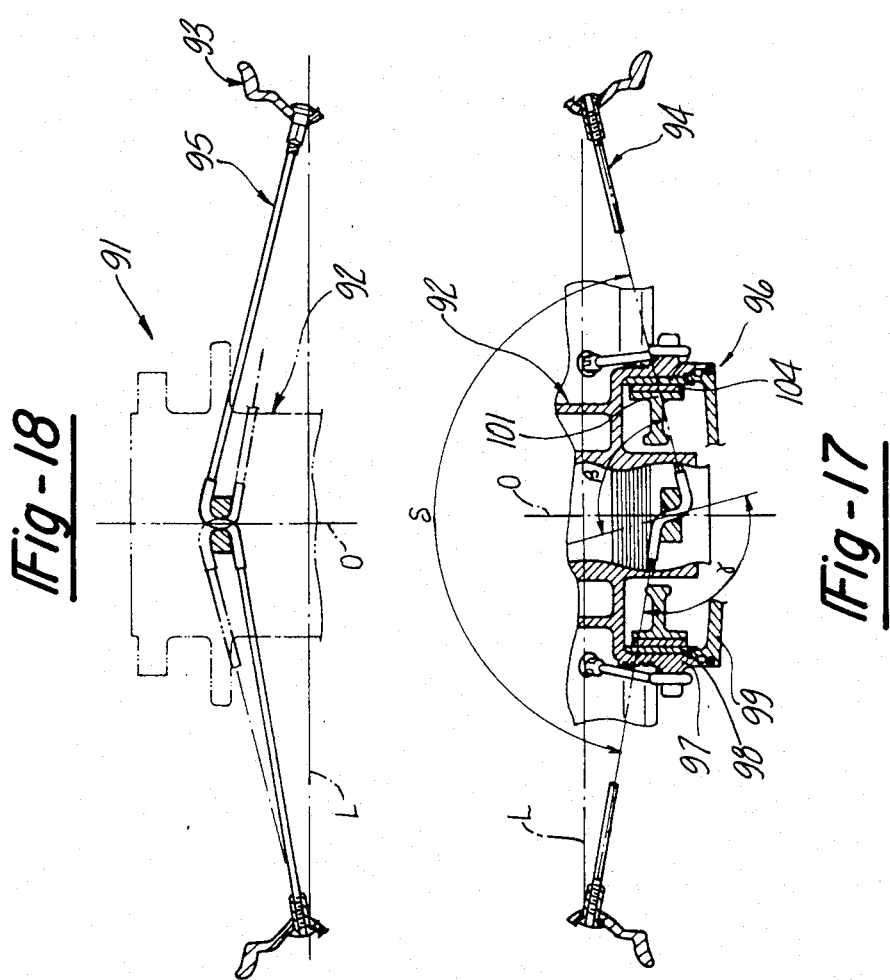

4,618,187

WIRE WHEEL

CROSS-REFERENCE TO RELATED APPLICATION

This application is a continuation-in-part of my application of the same title, Ser. No. 571,912, filed Jan. 18, 1984, (now abandoned) and assigned to the assignee of this invention.

BACKGROUND OF THE INVENTION

This invention relates to a wire wheel and more particularly to an improved spoke arrangement for such wheels.

As is noted in my aforenoted copending application, wire wheels have a number of advantages, particularly for use with light weight vehicles such as motorcycles or the like. However, there are some disadvantages to such wheels, as is also noted in my copending application. These disadvantages are that the wheels are somewhat complicated to manufacture and also that the spokes have a tendency to become loosened during operation in view of the differing and fluctuating loads placed upon them. As is noted in the copending application, it has been found that many of these disadvantages can be overcome if the spokes are arranged in pairs with the spokes of each pair having end portions that are affixed at their outer ends to the rim and which are integrally connected at their inner ends by an intermediate portion which is affixed to the hub. This application discloses several embodiments of improvements in such constructions.

SUMMARY OF THE INVENTION

The various features of the invention are adapted to be embodied in a wire wheel having a hub portion, a rim portion, and a plurality of spokes interconnecting the hub and rim portions. In accordance with all features of the invention, the spokes are arranged in pairs comprising a first end portion that is affixed at its outer end to the rim and a second end portion which is also affixed at its outer end to the rim. An intermediate portion integrally connects the inner ends of the end portions and lies at an angle to the end portions. The intermediate portion is affixed to the hub.

In accordance with a first feature of the invention, each end portion lies at a different angle to the intermediate portion and the angle encompassed by the end portions is less than 180°.

In accordance with another feature of the invention, the angles between the end portions and the intermediate portion are different from each other and the end portions lie at an angle less than 180° to each other. In addition, when view in a direction parallel to the axis of the hub, the angle between the end portions is less than 180°.

In accordance with another feature of the invention, the intermediate portion of the spokes has a greater diameter than the end portions.

In accordance with a still further feature of the invention, the opposite ends of the spoke end portions are spaced apart a distance less than the distance between the rim portion openings before assembly and the end portions are affixed to the rim by individual nipples. The distance between the inner ends of the nipples when inserted in the openings of the rim portion and prior to assembly is less than the distance between the ends of the spokes.

In accordance with a still further feature of the invention, the intermediate portion of the spokes are affixed to the hub portion by protrusions that extend outwardly from the hub portion.

In accordance with a still further feature of the invention, the intermediate portions extend through openings in the hub portion which openings have a larger diameter than the diameter of the intermediate portion of the spokes and curved ends which are curved about the same radius as the radius which interconnects the intermediate portion with the respective end portions so that the spokes will be retained relative to the hub by the engagement between the curved portions.

In accordance with a yet further feature of the invention, end portions are arranged so that they extend for an angle less than 180° when viewed in the direction of the axis of rotation.

In accordance with another feature of the invention, the angle between the spoke end portions when viewed in an axial direction is equal to or less than 180°.

BRIEF DESCRIPTION OF THE DRAWINGS

FIG. 3 is a side elevational view, in part similar to FIG. 2, and illustrates the geometric relationship.

FIG. 4 is a cross-sectional view showing the spoke arrangement and at one side of the wheel.

FIG. 5 is a cross-sectional view showing the spoke arrangement at the other side of the wheel.

FIG. 6 is an enlarged view showing the nipple receiving construction of the rim portion of this embodiment.

FIG. 13 is a side elevational view, in part similar to FIG. 12, showing the geometric relationships between the spokes.

FIG. 14 is a cross-sectional view looking generally downwardly and shows the spoke arrangement at one side of the wheel.

FIG. 15 is a view looking generally downwardly showing the other side of the wheel of this embodiment.

FIG. 17 is a top plan view of the spoke arrangement of the embodiment of FIG. 16 at the outer side of the wheel, with portions broken away.

FIG. 18 is a top plan view, with portions broken away, showing the spoke arrangement at the other side of the wheel in accordance with this embodiment.

DETAILED DESCRIPTION OF THE PREFERRED EMBODIMENTS

Embodiment of FIGS. 1 Through 9

Figure 1:
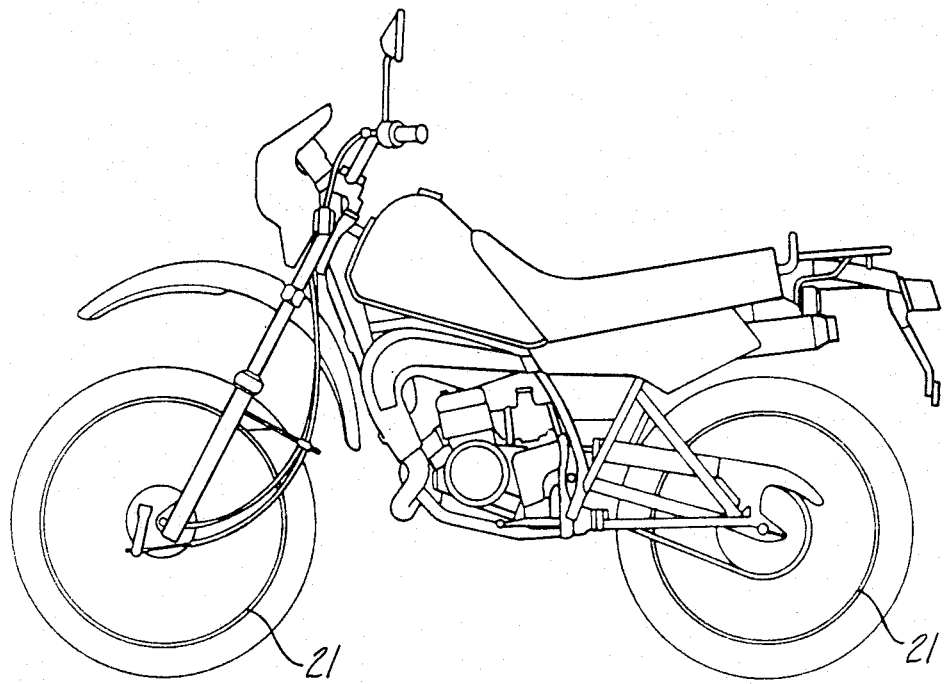
FIG. 1 is a side elevational view of a motorcycle having front and rear wire wheels constructed in accordance with an embodiment of the invention.

Referring first to FIG. 1, a motorcycle is illustrated having wire wheels at both its front and rear ends, identified by the reference numeral 21, which are constructed in accordance with the invention. Since the construction of the motorcycle per se forms no part of the invention, it will not be described in any detail.

Figure 2:
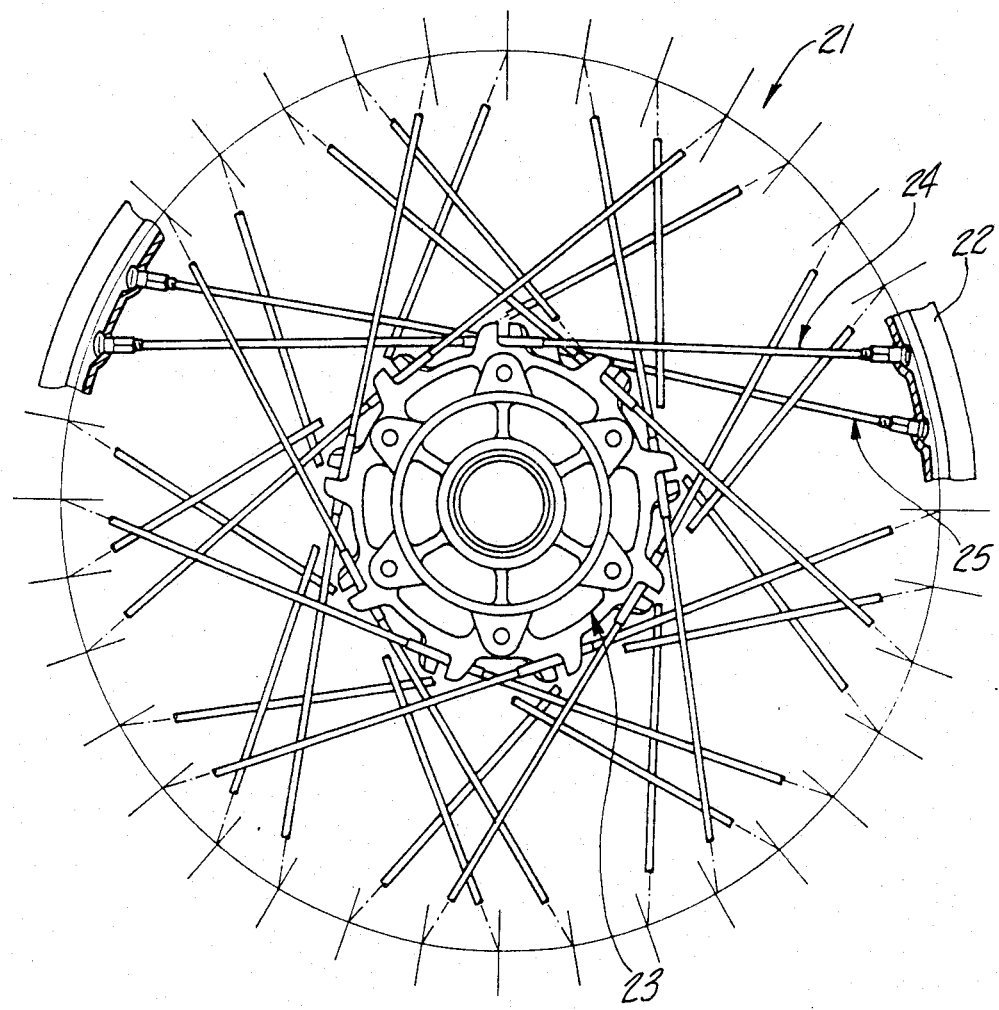
FIG. 2 is an enlarged, side elevational view, with portions broken away, showing the wire wheel construction of the embodiment of FIG. 1.
Figure 7:
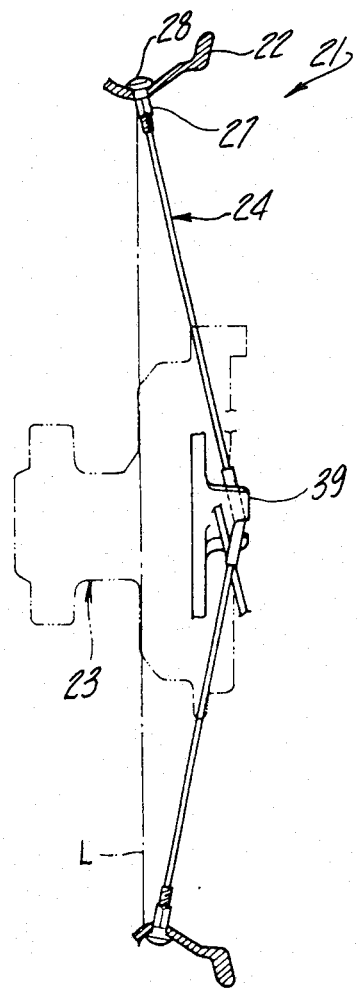
FIG. 7 is an enlarged view, with portions shown in section, of the embodiment.

Referring now primarily to the remaining figures of this embodiment and first to FIG. 2, the wheel 21 is comprised of a rim portion 22 that may be formed from a light alloy or the like and a hub portion 23, which is preferably formed from a light alloy or some strong alloy. The hub portion 23 and rim portion 22 are affixed to each other by a plurality of pairs of spokes. Spoke pairs 24 are provided at one side of the wheel 21 and spoke pairs 25 are formed at the other side of the wheel 21. In this embodiment, the spokes pairs 24 and 25 and their relationship to the hub and rim are substantially the same but mirror opposites of each other as shown in FIGS. 4 and 5 which illustrate the construction at opposite sides of the wheel 21. The center plane of the wheel in a direction perpendicular to its axis of rotation O—O is identified by the line L.

The spokes of the pairs 24 are comprised of first end portions 26 that extend outwardly in one direction from the hub portion 23 and are connected to the rim portion 22 by nipples including shanks 27 having internally threaded opening for receiving threaded ends of the spoke ends 27 and headed portions 28 that are received in specially formed depressions 29 formed in the rim portion 22. The depressions 29 have a configuration as shown in FIG. 6 and are formed with openings 31 so as to pass the nipple shanks 27.

The spokes of the pairs 24 also include another end portion 32 that extends in the opposite direction from the hub portion 23 to the rim portion 22 from the spoke end portion 26. The outer end of the spoke end portion 32 is affixed to the rim 22 by a nipple consisting of a threaded shank 27 and a headed portion 28.

Figure 8:
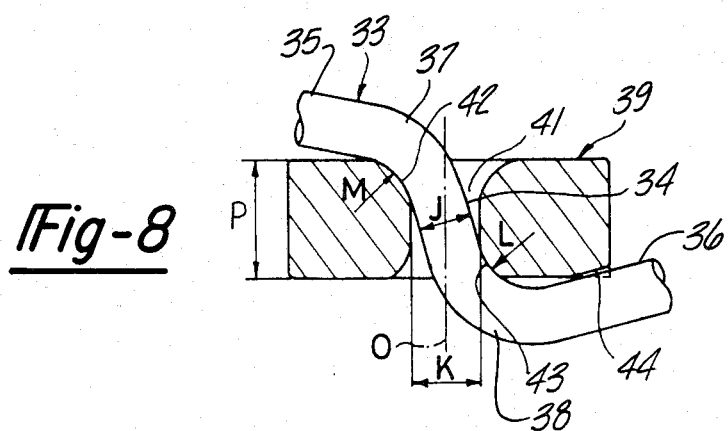
FIG. 8 is an enlarged view of the embodiment showing the arrangement of retention of the spoke pairs relative to the hub portion.

The spoke end portions 26 and 32 are integrally connected to each other by an intermediate portion 33 that has a larger diameter than the end portions 26 and 32. By employing a larger diameter, a greater strength is afforded in this area since it accommodates a greater load than the end portions per se. The intermediate portion 32 has a configuration as best shown in FIGS. 4, 5 and 8 and consists of a straight portion 34 that is disposed at an angle $\theta$ relative to the axis of rotation of the wheel O—O. The intermediate portion 34 is connected integrally to respective ends 35 and 36, that extend parallel to the spoke end portions 26 and 32 and which are integrally connected to them. The ends 35 and 36 are connected to the intermediate portion 34 by curved parts 37 and 38, respectively.

As may be readily seen from FIG. 4, the angle between the intermediate portion 34 and the end portion 26 $\gamma$ is substantially greater than the angle between the intermediate portion 34 and the end portion 32 which is designated by the angle $\beta$. The angle between the end portions 26 and 32 is identified by the angle $\delta$ and this angle is less than 180°. When viewed in the axial direction (FIG. 3), the angle between the end portions 26 and 32 of the spoke pairs is at an angle $\alpha$ which is, in this embodiment, less than 180°.

Figure 9:
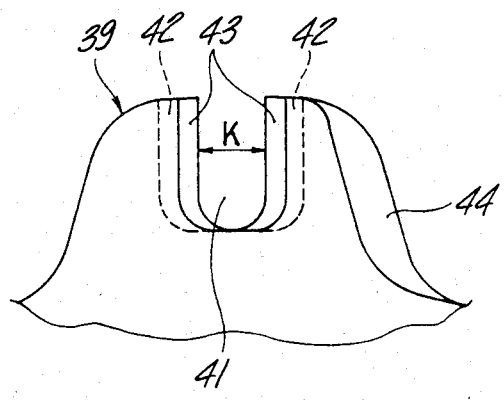
FIG. 9 is an enlarged, side elevational view showing one form of hub spoke retention opening.

In accordance with this embodiment of the invention, the spoke pairs 24 are affixed to the hub portion 23 by means of forming the hub portion 23 and specifically the flanges at each side thereof without outwardly extending projections, indicated generally by the reference numeral 39. The affixing portions 39 are formed with radially and axially outwardly openings slots 41 that are configured, as best shown in FIGS. 8 and 9, so as to rigidly affix the spoke intermediate portions 34 while minimizing stresses on the intermediate portions 34.

As has been noted, the intermediate portions 34 have a larger diameter J than the end portions 26 and 32. The openings 41 are formed with a diameter, looking in the axial direction, identified by the dimension K which is greater than the dimension J so as to afford clearance. At one side and specifically at the inner side from which the spoke end portion 26 extends, the opening 41 is configured with a curved surface 42 that has a radius M which is equal to the radius of the intermediate part curved portion 37. In a like manner, the opposite end of the opening 41 (the outer end from which the spoke end portion 32 radiates) is curved as at 43 about a radius L which is equal to the radius of the intermediate portion curved part 38.

Hence, the spoke intermediate portion 33 is retained within the opening 41 by engagement with curved rather than sharp edged surfaces. This will insure that there will be no likelihood of damage to the spoke nor will there be a likelihood of premature failure due to notching or wearing of the spoke in the area where it passes through the openings 41. To further provide such assurance against notching, the flange portion 39 adjacent the end 36 of the intermediate portion is relieved as at 44. As has been previously noted, the angle $\beta$ is substantially less than the angle $\gamma$ and without the relief 44, there would be a sharp edge engagement between the projection 39 and the spoke intermediate portion 36 which might otherwise cause notching or wear.

As has been previously noted, the spoke of the spoke pairs 25 are substantially the same in construction as those of the spoke pairs 24 but are mirror images. As may be seen in the figures, the spoke pairs 25 consist of end portions 45 and 46 that are integrally connected by an intermediate portion 47 which is larger in diameter than the end portions 45 and 46. The end portion 47 is received in an opening 48 formed in projections 49 formed on the corresponding side of the hub portion 23 and configured as with those described in conjunction with the projections 39. Because of this similarity in construction, the details will not be described again.

The ends of the spoke end portions 45 and 46 are affixed to the rim 22 in slightly offset fashion relative to the spokes of the pair 24 as may be clearly shown in FIGS. 2 and 3. For this purpose, the spoke ends are received in threaded parts 51 of nipples having headed portions 52. Since the construction is otherwise the same as that described in conjunction with the side asociated with the spoke pairs 24, this description is not repeated nor is a description of the respective angular relationships, which as have been noted, are the same but mirror images of those already described.

There is a specific geometric relationship between the various components, shown best in FIGS. 3 and 6, which facilitates assembly. The distance between the outer peripheries of the threaded ends of the spokes of the pairs 24 and 25 is identified by the dimension C. This dimension is greater than the dimension between the inner ends of the threaded portions 27 and 51 of the respective nipples. Also, the dimension D between the base of the nipple recieving openings is greater than the distance between the spoke ends C. Thus, the wheel may be conveniently assembled by assembling the spoke pairs 24 and 25 into the openings 41 and 48 of the hub projections 39 and 49 and then inserting the nipples through the rim openings and tightening them onto the spoke ends. Thus, a very simple and yet highly effective assembly method is afforded which will insure a tight construction, absence of loosening and absence of wear.

Figure 10:
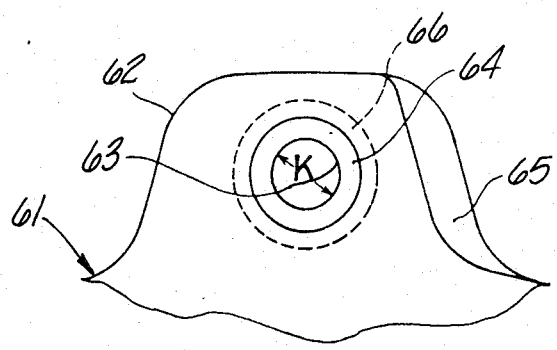
FIG. 10 is a side elevational view, in part similar to FIG. 9, showing another spoke retaining embodiment.

Embodiment Of FIG. 10

In the embodiment of FIGS. 1 through 9, the spoke intermediate portions were received in outwardly extending openings and projections formed on the flanges of the hub portion. This arrangement affords ease of asesmbly. However, it is also possible to utilize the same concept in conjunction with an arrangement wherein the projections are formed with closed openings in the form of holes and such an embodiment is shown in FIG. 10 and also in the lower portion of FIG. 3. In accordance with this embodiment, a hub, indicated generally by the reference numeral 61, is formed with a plurality of outwardly extending projections 62. These projections are formed with a cylindrical bore 63 having a diameter K, which diameter is equivalent to the corresponding diameter of the slots 41 of the previous embodiment and which is larger than the diameter of the wire intermediate portion J. One side of the bore 63 is formed with an arcuate relief 64 which is equivalent to the radius L of the curved portion 38 of the spoke intermediate portion. As with the previous embodiment, the corresponding side of the projection 62 is formed with a relief 65 to afford clearance for the end part 36 of the spoke intermediate portion.

The opposite side of the bore 63 is formed with a relief 66 which is curved about a diameter radius M that corresponds to the radius of the intermediate spoke curve part 37. Thus, this embodiment, like the embodiment of FIGS. 1 through 9, will engage the spoke intermediate parts and retain them at their curved portions rather than having a sharp edge engagement which could cause notching and wear.

Figure 11:
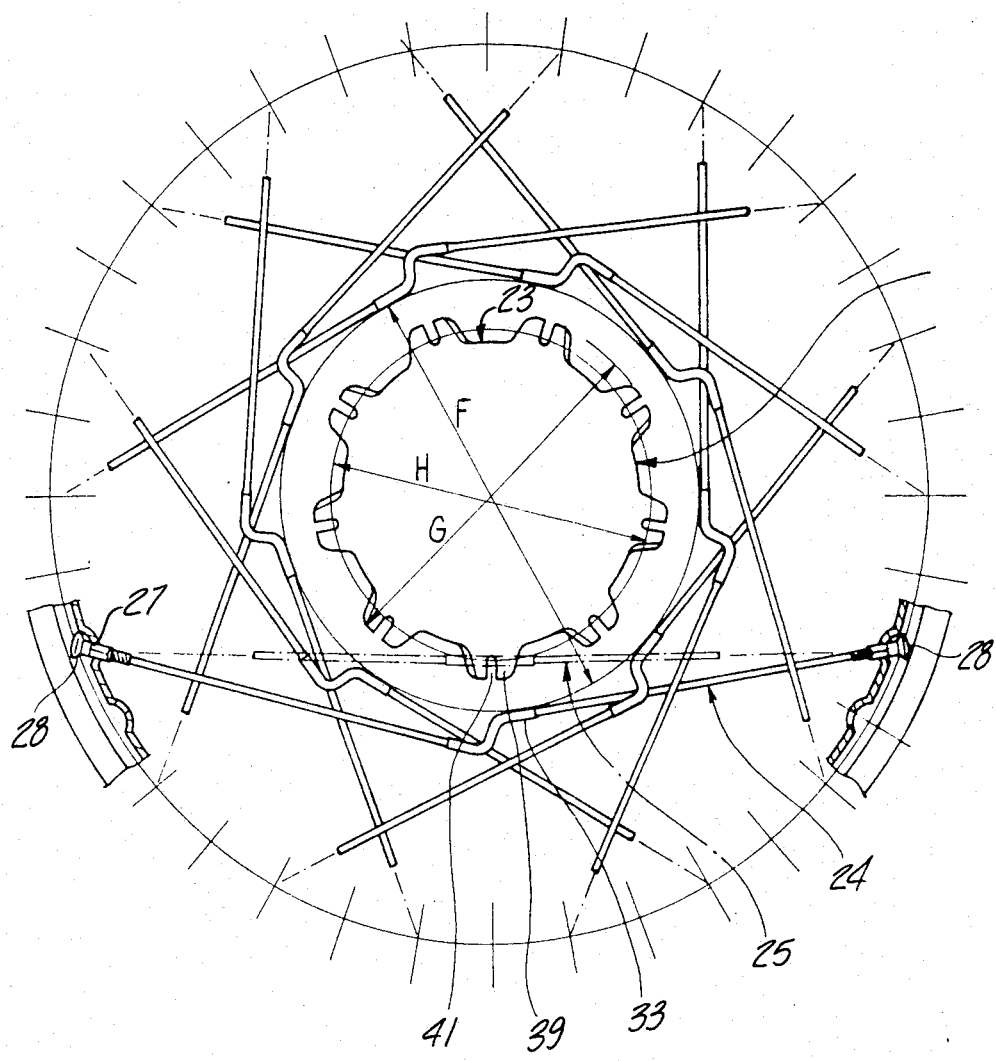
FIG. 11 is a side elevational view showing a method by which the wheel may be assembled.
Figure 12:
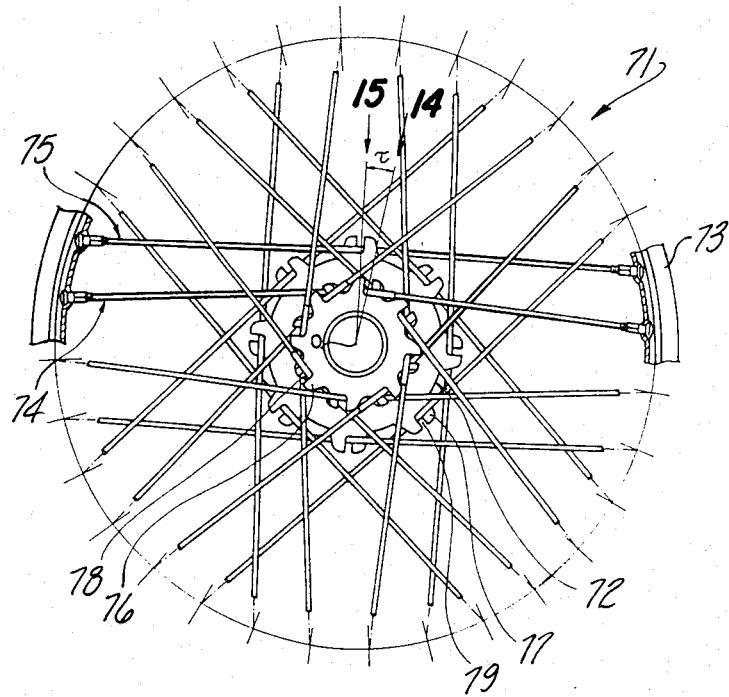
FIG. 12 is a side elevational view of a wheel constructed in accordance with another embodiment of the invention.

Embodiment Of FIG. 11

FIG. 11 illustrates another method by which the wheel of the embodiment of FIGS. 1 through 9 may be easily and conveniently assembled. Because the elements are the same as those of FIGS. 1 through 9, they have been identified by the same reference numerals and their basic construction will not be described again. Only the manner of assembly will be described in conjunction with FIG. 11.

In accordance with this assembly method, the spokes of the spoke pairs 24 and 25 are inserted into the rim and their associated nipples are only loosely fastened to them. The spoke pairs at each side of the wheel are then rotated so that their intermediate portions 33 in the case of the spoke pairs 24) are displaced at a diameter F which is substantially greater than the diameter G at the outer end of the hub projections 39. The hub 23 may then be freely inserted into the assemblage consisting of the rim and spokes as shown in FIG. 11.

The spokes of the spoke pairs 24 and 25 are then rotated so that their respective intermediate portions will be received in the openings 41 of the hub portions 39 so as to affix the spokes to the hub portion 23. The nipples are then tightened so as to complete the assembly.

It should be readily apparent that this construction method offers considerable advantages and is possible because of the use of the outwardly opening slots 41 in the hub portion and the offset configuration of the spoke pairs and their intermediate portions which has already been described.

Embodiment Of FIGS. 12 Through 15

FIGS. 12 through 15 show another embodiment of the invention wherein the wheel, indicated generally by the reference numeral 71, includes a hub portion 72 and a rim portion 73 which are joined together by means of a plurality of spoke pairs, 74 and 75. In accordance with this embodiment of the invention, the hub portion 72 is provided with a first flange 76 to which the spokes of the spoke pairs 74 are affixed. In addition, the hub portion 72 is formed with a further flange 77 to which the spokes of the spoke pairs 75 are affixed. In accordance with this embodiment, the hub flange 76 has affixing projections 78 that receive the intermediate portions of the spokes of the spoke pairs 74. The flange 77 is formed with projections 79 that receive the spokes of the spoke pairs 75. The portions 79 extend radially outwardly a greater distance than the portions 78 and these portions are offset with respect to each other in a radial direction by the dimension $\tau$.

The geometry of the spokes of the spoke pairs 74 and 75 is the same as the embodiment of FIGS. 1 through 9 and for that reason the geometric relationships between the ends of the spokes of the spoke pairs and their relationship to the attaching nipples will not be described again in detail. However, the corresponding angular relationships have been identified in FIGS. 14 and 15 so as to permit comparison between this figure and the figure of the previously described embodiment.

In accordance with this embodiment and as has been previously noted, a center line A passing through the center of the openings of the spoke receiving projections 77 is offset relative to the axis of rotation O—O of a corresponding center line B through the openings of the spoke retention portions 76 by the angle $\tau$. The diameter of the spoke receiving openings of the dimension G is substantially smaller than the corresponding diameter H of the spoke receiving openings of the flange portion 77. It should be noted that the spoke end portions 78 and 79 of the spoke pairs 74 are disposed at slightly different angles relative to the center line B when viewed in an axial direction. The angle between the line B and the spoke end 79 $\epsilon$ is slightly less than the angle $\sigma$ of the spoke end 78. The included angle $\alpha$ between the spoke ends is less than 180°. The angle between the spoke ends of the other pair is somewhat greater but still less than 180°.

Figure 16:
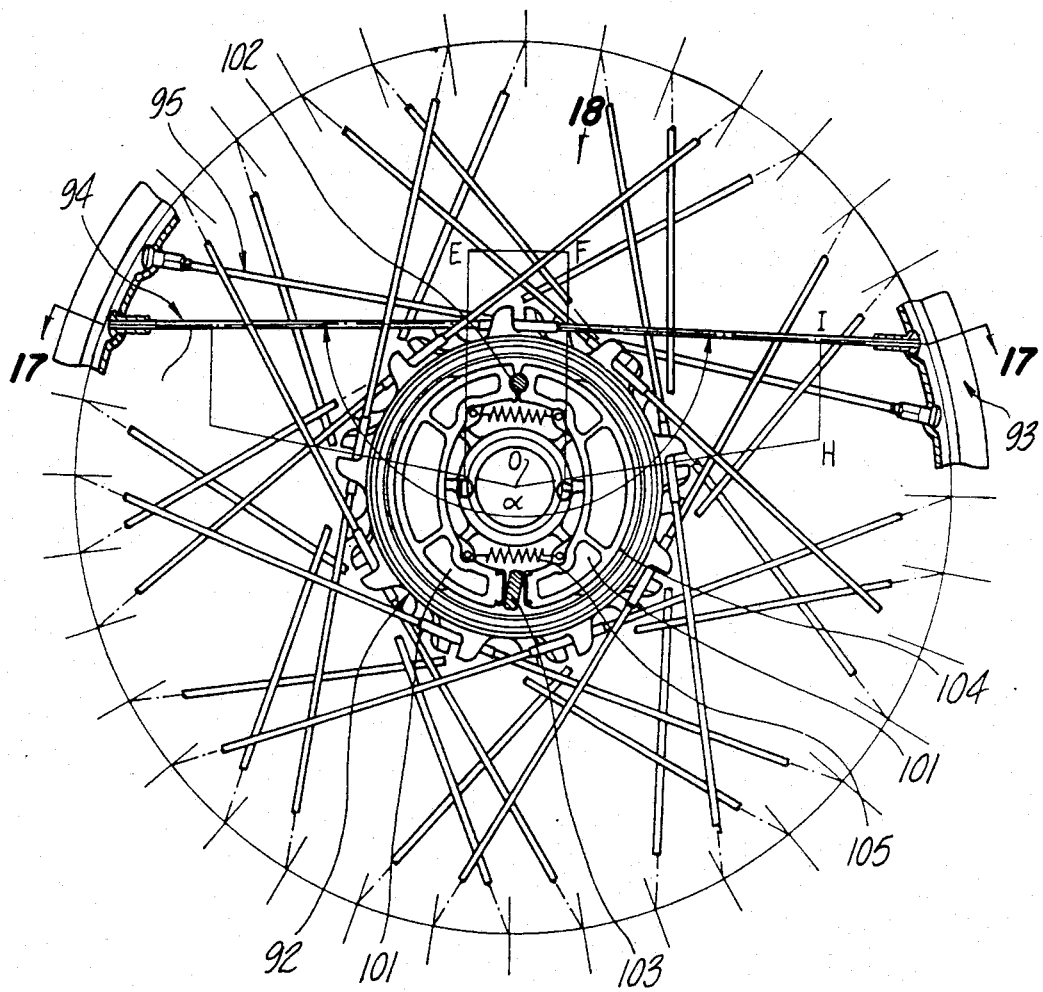
FIG. 16 is a side elevational view of a wheel constructed in accordance with yet another embodiment of this invention.

Embodiment Of FIGS. 16 Through 18

A wire wheel constructed in accordance with a still further embodiment of this invention is identified generally by the reference numeral 91. Like the previous embodiments, the wheel 91 is comprised of a hub portion 92, a rim portion 93 and a plurality of spoke pairs 94 and 95 at opposite sides of the wheel. As with the previously described embodiments, the spokes of the spoke pairs 94 and 95 are integrally connected to each other by means of intermediate portions that are affixed to the hub portion 92 in the manners previously described. Also, the spoke ends are connected to the rim 93 by nipples in a manner as previously described. Since the basic construction and geometry is the same as in the previously described embodiments, this geometry and specifically the relationship between the ends of the spoke pairs and their intermediate portion will not be described again in detail, however, certain of the geometric relationships are illustrated in the drawings.

In accordance with this embodiment, the wheel 91 includes an internal shoe type brake assembly, indicated generally by the reference numeral 96. The brake 96 is formed internally of the hub portion 92 at one side of the wheel. To this end, the hub 92 is formed with an enlarged cylindrical portion 97 that is adapted to carry a brake drum surface 98 that is fixed to the cylindrical portion 97 in a suitable manner, as by a shrink fit. The drum portion 98 is formed from cast iron or the like and may also be held in place by means of a cover plate 99 that is affixed to the cylindrical portion 97.

A pair of brake shoes 101 are positioned within the cylindrical portion 97 and are abuttingly engaged at one of their ends with a steady rest pin 102. A cam type actuator 103 is journaled for rotation and is engaged with the other ends of the shoes 101 so as to move friction linings 104 carried by the respective shoes 101 into engagement with the drum surface 98 upon actuation. Suitable return springs 105 are provided between the shoes 101 for retracting the shoes 101 when the cam actuator 103 is released.

In accordance with this embodiment of the invention, the diameter of the spoke receiving openings of the hub portion 91 is substantially greater than with the previously described embodiments so as to accommodate the drum brake 96. Therefore, the angle α between the ends of the spoke pairs in this embodiment is equal to or less than 180°. As has been previously noted, all other geometric relationships are the same as in the previously described embodiments and, for that reason, the description of these relationships will not be repeated.

It should be noted that the spoke and brake construction as illustrated and described permits a greater brake capacity for a given wheel than the spoke arrangements previously employed. Because the spokes are arranged in pairs that are integrally connected by an intermediate portion that is affixed to the hub portion, a compressive load is placed upon the brake drum 98 which resists the force of the brake shoes 101 that tries to cause the drum to expand radially outwardly upon application of the brake shoes. Hence, the brake capacity is maintained and at the same time the brake force tends to keep the spokes of the spoke pairs tight.

With previously proposed types of wheel constructions wherein individual spokes are employed, the spokes apply a tensile or expansive force on the brake drum. This force acts in the same direction as the force exerted by the brake shoes upon engagement and thus not only reduces the capacity of the brake but tends to cause loosening of the spokes when the brakes are applied. These disadvantages are clearly avoided with the wheel construction as described in this application and specifically in the embodiment of FIGS. 16 through 18.

It should be readily apparent from the foregoing description that several embodiments of the invention have been illustrated and described, each of which provides an easy to assembly and high strength construction and which will insure against loosening of the spokes during operation. Although a number of embodiments of the invention have been illustrated and described, various other changes and modifications may be made, without departing from the spirit and scope of the invention, as defined by the appended claims.

I claim:

1. A wire wheel having a hub portion, a rim portion, and a plurality of spokes interconnecting said hub and said rim portions, said spokes being arranged in pairs comprising a first end portion fixed at its outer end to said rim portion and a second end portion fixed at its outer end to said rim portion, an intermediate portion integrally connecting the inner ends of said end portions and lying at an angle to said end portions and affixed to said hub portion, the improvement comprising said intermediate spoke portion being connected to said spoke end portions by respective curved parts, said end portions each being disposed at an angular relation to the intermediate portion with the angle between each end portion and the intermediate portion being different from the other, the angle encompassed by said end portions being less than 180°, said hub portion having an opening receiving said spoke intermediate portion for affixing said spokes to said hub portion, said opening being formed with a diameter larger than the diameter of the spoke intermediate portion and being curved on its opposite faces at the same radius as the corresponding curved parts of the intermediate portion.

2. A wire wheel as set forth in claim 1 wherein the hub portion openings are circular.

3. A wire wheel as set forth in claim 1 wherein the hub portion openings are slotted openings open at their outer ends.

4. A wire wheel as set forth in claim 1 wherein the hub portion openings are circular.

5. A wire wheel as set forth in claim 1 wherein the hub portion openings are slotted openings open at their outer ends.

6. The method of assembling a wire wheel having a hub portion, a rim portion, and a plurality of spokes interconnecting the hub and the rim portions, the spokes being arranged in pairs comprising a first end portion fixed at its outer end to the rim portion and a second end portion fixed at its outer end to the rim portion, an intermediate portion integrally connecting the inner ends of said end portions and lying at an angle to said end portions and affixed to the hub portion, the ends of the end portions being affixed to the rim portion by nipples, the hub portion having outwardly extending projections with outwardly opening slots adapted to receive the intermediate portions of the spoke pairs for affixing said spoke pairs to said hub portion comprising the steps of affixing the ends of the spoke end portions loosely to the rim portion by only partially tightening the nipples, rotating the spokes so that the intermediate portions are disposed at a diameter greater than the diameter of the hub projections, inserting the hub portion into the area between the spoke intermediate portions, rotating the spokes so that the intermediate portions are engaged in the hub portion outwardly opening slots and final tightening the nipples.

* * * * *